2 Sheets--Sheet 1.

A. B. PROUTY.
Card-Setting Machines.

No. 155,972.  Patented Oct. 13, 1874.

Witnesses.
L. A. Stevens.
C. W. Stevens.

Inventor:
Augustus B. Prouty.
Per W. X. Stevens.
Atty.

2 Sheets--Sheet 2.
A. B. PROUTY.
Card-Setting Machines.
No. 155,972. Patented Oct. 13, 1874.
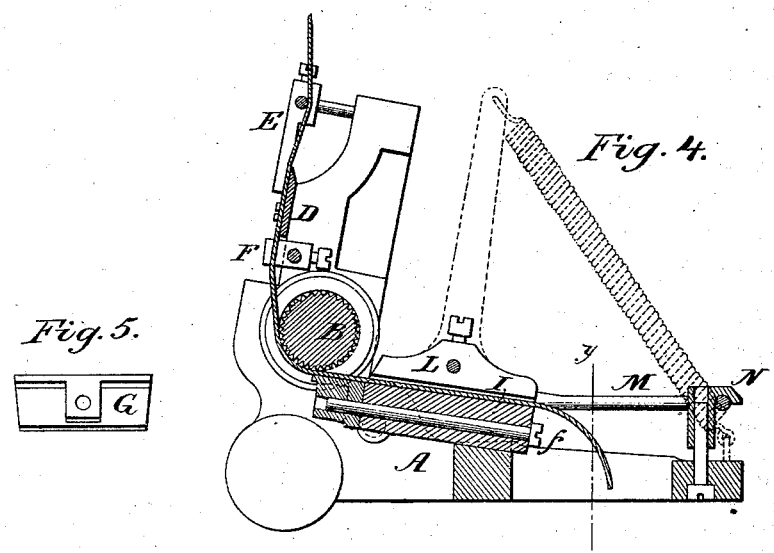
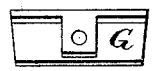
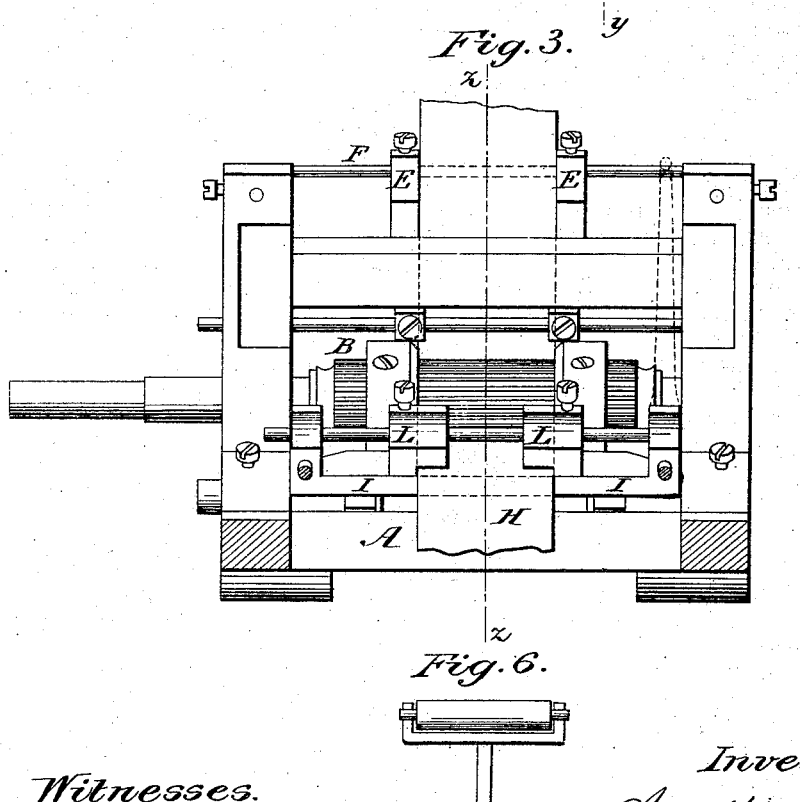
Witnesses.
L. A. Stevens.
C. W. Stevens.
Inventor:
Augustus B. Prouty.
Per W. X. Stevens.
Atty.

UNITED STATES PATENT OFFICE.

AUGUSTUS B. PROUTY, OF WORCESTER, MASSACHUSETTS.

IMPROVEMENT IN CARD-SETTING MACHINES.

Specification forming part of Letters Patent No. 155,972, dated October 13, 1874; application filed September 26, 1873.

*To all whom it may concern:*

Be it known that I, AUGUSTUS B. PROUTY, of the city and county of Worcester and State of Massachusetts, have invented an Improvement in Card-Setting Machines, of which the following is a specification:

The object of my invention is to provide means for guiding the strips of leather or other material, technically called a "fillet," and in which the teeth of cards are set so accurately that the teeth may be set close to the edge of the strip, thus saving the time required for the operation, as well as the material that is trimmed off and goes to waste in the ordinary method of producing machine cards; also, in equalizing the forward movement or feed of the fillet; and these objects I accomplish, first, by an arrangement of the guides, as will be hereinafter fully set forth; and, secondly, by using a peculiarly-shaped pressure pad or roll, which keeps the fillet in contact with the feed-roll.

Figure 2:
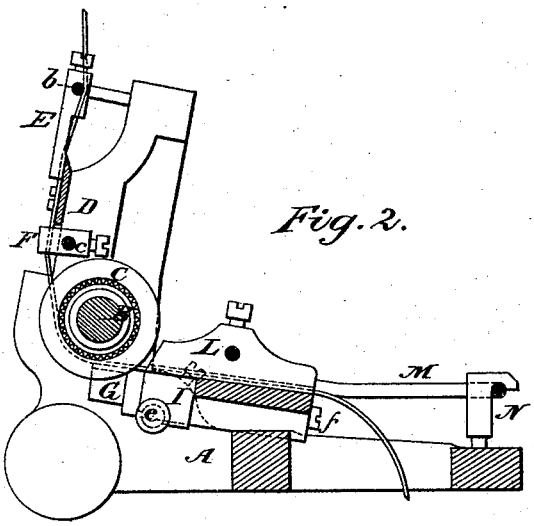
Figure 1:
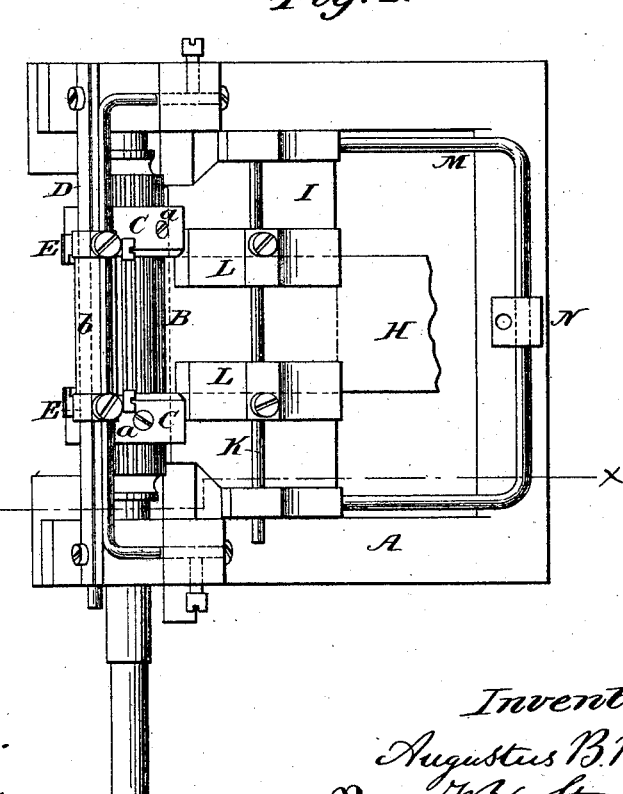

In the accompanying drawings, Figure 1 is a plan view of the machine. Fig. 2 represents a vertical section of the same on the line $x\ x$ of Fig. 1. Fig. 3 is a rear elevation, partly in section. Fig. 4 is a vertical section on line $z\ z$ of Fig. 3. Fig. 5 represents a front view of the balanced pressure-pad; and Fig. 6, a modification of the same, in which a roll is substituted for that part of the pad which is opposite to and bears against the feed-roll.

B is a fluted feed-roll, and has upon its surface the movable collars C C, which are secured, by means of the set-screws $a\ a$, at any desired point in the length of the roll to correspond with the width of the fillet, and assists in guiding it. D is the rest, secured at each end to the upright side pieces of the frame A, and over the edge of which the card-teeth are set and bent by mechanism. (Not shown in the drawings.) E E and F F are guides, adjustably secured to the horizontal bars $b$ and $c$ by set-screws. The guides E E are long and bear at their lower ends on the rest D to prevent the action of inserting the teeth from moving the fillet edgewise; the others, also, assist in retaining the fillet in the exact line required, by bearing lightly against its edges. G is a pivoted pressure bar or pad, of such length as to pass easily between the collars C, and which presses the fillet H against the feed-roll B with sufficient force to cause it to have a movement equal in velocity to that of the feed-roll.

A modification of this pressure-bar is seen in Fig. 6, where the bearing-surface is composed of a roll instead of a smooth rounded plate, as shown in Fig. 5.

An oscillating box, I, is suspended by trunnions $e$ to the frame A, and has inserted in it a spindle, $f$, upon which the pressure-bar is pivoted. It is also provided upon its upper side with a cross-bar, K, upon which are secured by means of set-screws the pair of guides L L. From the rear of this oscillating box projects a spring-bar, M, which passes under, and is secured by an adjustable hook, N, in the rear of the frame A.

It will be seen that when the spring-bar is depressed, the box I, rocking upon its trunnions, forces the pressure-bar into closer proximity to the feed-roll, thus causing the latter to take a firmer hold upon the fillet.

A modification of these devices is seen in Fig. 4, where a vertical lever is shown attached to the oscillating box, and the necessary pressure maintained upon the fillet through the agency of a spring, one end of which is secured to the rear of the frame A, and the other to the upper end of the vertical lever; but I prefer the spring-bar and adjustable hook arranged as shown in Fig. 1.

The pressure-bar G, when constructed as a flat pad or roll and suspended in the manner shown, so as to have a perfectly free self-adjustment of its bearing-surface, will be found to present a new and valuable feature in this class of machines, as the fillets are never of the same thickness and consistency throughout. A fixed bar or roll will not give an equal pressure at all times, thus allowing inequalities in the rate of speed at which the fillet is fed forward, and consequently a corresponding difference in the setting of the teeth.

In operating this machine, the fillet is introduced from below, and first passes between the guides L; thence around the feed-roll, between the adjustable collars C; and thence upward through the guides F to the setting-rest D; thence onward between the guides E and back of the bar $b$ out of the machine.

It will be seen that the fillet, while passing through the machine, is almost continuously under the control of the guides, which keep it in a direct line, thus allowing the setting mechanism to insert the teeth close to its edges, maintaining at the same time a perfect regularity in the width of margin, leaving nothing to be trimmed off, but turning out the fillet ready for application to the cylinders of a carding-engine.

Having thus described my invention, I claim as new and desire to secure by Letters Patent—

1. The long parallel and adjustable guides E E, their lower ends resting upon the face of of the setting-bar D, as and for the purpose set forth.

2. The combination of the guides F F, placed between the feeding-roll and the setting-bar, with the lower guides L L and the upper guides E E, as and for the purpose specified.

3. The adjustable guide-collars C C, secured upon the fluted feed-roll B, substantially as and for the purpose specified.

4. The pressure-bar G, pivoted upon the spindle $f$, in combination with the oscillating box I and feed-roll B, substantially as and for the purpose specified.

AUGUSTUS B. PROUTY.

Witnesses:
L. A. STEVENS,
C. W. STEVENS.